(12) United States Patent
Ohkubo

(10) Patent No.: US 7,075,678 B2
(45) Date of Patent: Jul. 11, 2006

(54) PROFILE PRODUCING APPARATUS, PROFILE PRODUCING METHOD, AND PROFILE PRODUCING PROGRAM STORAGE MEDIUM

(75) Inventor: Akito Ohkubo, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 982 days.

(21) Appl. No.: 09/984,855

(22) Filed: Oct. 31, 2001

(65) Prior Publication Data

US 2002/0051158 A1  May 2, 2002

(30) Foreign Application Priority Data

Oct. 31, 2000  (JP)  ............... 2000-333155

(51) Int. Cl.
*G06F 15/00*  (2006.01)

(52) U.S. Cl. ............... 358/1.9; 358/518; 358/504; 358/523; 382/167

(58) Field of Classification Search ............... 358/518, 358/504, 523, 1.6, 1.9; 382/167
See application file for complete search history.

(56) References Cited

U.S. PATENT DOCUMENTS

| | | | | |
|---|---|---|---|---|
| 5,760,913 A | * | 6/1998 | Falk | 382/167 |
| 6,075,888 A | * | 6/2000 | Schwartz | 382/167 |
| 6,141,120 A | * | 10/2000 | Falk | 358/504 |
| 6,215,562 B1 | * | 4/2001 | Michel et al. | 358/1.9 |
| 6,671,067 B1 | * | 12/2003 | Adam et al. | 358/1.6 |
| 6,761,426 B1 | * | 7/2004 | Tsuchiya et al. | 347/19 |
| 6,888,648 B1 | * | 5/2005 | Odagiri et al. | 358/1.9 |
| 2004/0130739 A1 | * | 7/2004 | Adam et al. | 358/1.9 |
| 2004/0136013 A1 | * | 7/2004 | Mestha et al. | 358/1.9 |

FOREIGN PATENT DOCUMENTS

| | | |
|---|---|---|
| JP | 7-209946 | 8/1995 |
| JP | 9-173376 | 7/1997 |
| JP | 11-261831 | 9/1999 |

OTHER PUBLICATIONS

Patent Abstract of Japan 07-209946 Aug. 11, 1995.
Patent Abstract of Japan 09-173376 Jul. 8, 1997.
Patent Abstract of Japan 11-261831 Sep. 24, 1999.

* cited by examiner

*Primary Examiner*—Kimberly Williams
*Assistant Examiner*—Beniyam Menberu
(74) *Attorney, Agent, or Firm*—Sughrue Mion, PLLC

(57) ABSTRACT

There are disclosed a profile producing method and a profile producing apparatus for producing a profile taking into consideration a performance of a device and a distortion of colors. A creation of a profile and a verification of a performance of a device are performed in accordance with read data in which a color chart, wherein the same gray patches are disposed at a plurality of places on a chart sheet and at the common places of a plurality of chart sheets, is read.

21 Claims, 16 Drawing Sheets

PROFILE PRODUCING APPARATUS, PROFILE PRODUCING METHOD, AND PROFILE PRODUCING PROGRAM STORAGE MEDIUM

BACKGROUND OF THE INVENTION

1. Field of the Invention

The present invention relates to a profile producing method and a profile producing apparatus for producing a profile using a color chart and a profile producing program storage medium storing a profile producing program which causes a computer to operate as the profile producing apparatus when the profile producing program is incorporated into the computer.

2. Description of the Related Art

Hitherto, there is known a profile producing method and a profile producing apparatus for producing a profile defining an association between coordinates of a color space depending on a device such as a printer and a scanner for performing input and output of images and coordinates of a color space independent of the device, using a color chart in which color patches are arranged. For example, in a shop photographic print system in which an image of a photographic print is read by a scanner and fed to a computer in form of an original image, so that a copy of the original image is created on the computer and is outputted on the photographic print by a printer, the computer operates as the profile producing apparatus so that a profile suitable for the scanner and the printer is created in form of for example an LUT (Look Up Table). And a color conversion between the color space depending on the device and the color space independent of the device is applied to the original image in accordance with the profile, so that a color of the photographic print of the original is coincident with a color of the photographic print of the copy.

Hitherto, to create the profile, there are used a color chart referred to as IT8 for example and a lattice color chart in which color patches corresponding to lattice points on a predetermined lattice defined in a color space are arranged in a similar fashion to that of lattice points on the color space.

By the way, to create profiles suitable for devices such as a printer and a scanner, respectively, an image of a color chart is inputted and outputted by the associated device so that a profile is created in accordance with a color of the color chart thus inputted and outputted. Further, when an image is inputted and outputted by a device, generally, it involves a distortion of a color in an in-plane direction of the image and a fluctuation in color by a change with elapse. A high-performance device is small in such distortion and fluctuation, and a device, which is low in performance, is large in such distortion and fluctuation.

The above-mentioned distortion and fluctuation greatly have an effect on accuracy and continuity of the profile. For this reason, at the time of creation of the profile, it is desired to create the profile taking into consideration the performance of the device, which will cause the above-mentioned distortion and fluctuation, and those distortion and fluctuation, particularly the performance when the color chart is inputted and outputted by the device.

SUMMARY OF THE INVENTION

In view of the foregoing, it is an object of the present invention to provide a profile producing method and a profile producing apparatus capable of producing a profile taking into consideration the performance of the device and a distortion of color, and a profile producing program storage medium storing a profile producing program which causes a computer to operate as the profile producing apparatus.

To achieve the above-mentioned object, the present invention provides a first profile producing apparatus comprising:

a data obtaining section for obtaining read data in which colors of patches constituting a color chart, wherein a plurality of patches each having a predetermined color is arranged and same gray patches are arranged at a plurality of places, are read;

a profile producing section for producing a profile defining an association between coordinate points on a color space depending on a device performing at least one of input and output of an color image and coordinate points on a color space independent of said device in accordance with the read data obtained by said data obtaining section; and a performance verification section for verifying a performance of said device in accordance with read data involved in the gray patches of the read data obtained by said data obtaining section.

To achieve the above-mentioned object, the present invention provides a second profile producing apparatus comprising:

a data obtaining section for obtaining read data in which colors of patches of a plurality of chart sheets constituting a color chart, wherein a plurality of patches each having a predetermined color is arranged on each chart sheet and same gray patches are arranged at common places of the plurality of chart sheets, are read;

a profile producing section for producing a profile defining an association between coordinate points on a color space depending on a device performing at least one of input and output of an color image and coordinate points on a color space independent of said device in accordance with the read data obtained by said data obtaining section; and a performance verification section for verifying a performance of said device in accordance with read data involved in the gray patches of the read data obtained by said data obtaining section.

According to the first and second profile producing apparatuses of the present invention, a performance of a device is verified when a color chart is inputted and outputted. Thus, it is possible to again create a profile in accordance with the verified performance of the device, and also to create a profile to which data representative of the performance of the device is appended.

In the first and second profile producing apparatuses according to the present invention as mentioned above, it is preferable that said profile producing apparatus further comprises a correcting section for correcting the profile in accordance with the read data involved in the gray patches of the read data obtained by said data obtaining section.

According to the profile producing apparatus as mentioned above, it is possible to create a profile free from a distortion in color and an influence of a fluctuation.

To achieve the above-mentioned object, the present invention provides a third profile producing apparatus comprising:

a data obtaining section for obtaining read data in which colors of patches constituting a color chart, wherein a plurality of patches each having a predetermined color is arranged and specific color patches each having a specific color for color accuracy verification are arranged, are read;

a profile producing section for producing a profile defining an association between coordinate points on a color space depending on a device performing at least one of input and output of an color image and coordinate points on a color space independent of said device in accordance with the read data obtained by said data obtaining section; and an accuracy verification section for verifying an accuracy of said profile in accordance with read data involved in the specific color patches of the read data obtained by said data obtaining section.

According to the third profile producing apparatus of the present invention as mentioned above, a creation of a profile and a verification of accuracy of a profile are performed in accordance with the read data. Thus, it is possible to exactly verify accuracy of a profile without influence of fluctuation in color caused at the time of input and output of a color chart.

In the third profile producing apparatus according to the present invention as mentioned above, it is preferable that said profile producing apparatus further comprises a correcting section for correcting the profile in accordance with the read data involved in the specific color patches of the read data obtained by said data obtaining section.

According to the profile producing apparatus having the correcting section as mentioned above, it is possible to create a profile with great accuracy.

To achieve the above-mentioned object, the present invention provides a fourth profile producing apparatus comprising:

a data obtaining section for obtaining read data in which colors of patches constituting a color chart, wherein a plurality of patches each having a predetermined color is arranged and regarding main patches of the plurality of patches, patches having relatively high saturation of colors are arranged outside more than patches having relatively low saturation of colors, are read; and a profile producing section for producing a profile defining an association between coordinate points on a color space depending on a device performing at least one of input and output of an color image and coordinate points on a color space independent of said device in accordance with the read data obtained by said data obtaining section.

Generally, colors in lower saturation are easily effected by a distortion of color. Further in general, a distortion of color is small with nearer areas to the center. Thus, patches having relatively low saturation of colors are disposed at the center side, and patches having relatively high saturation of colors are disposed outside. This feature makes it possible to suppress an influence of a distortion of color.

Incidentally, it is acceptable that the patches having relatively low saturation of colors are a series of gray patches used in calibration for a gray axis.

To achieve the above-mentioned object, the present invention provides a first profile producing method comprising:

a data obtaining step of obtaining read data in which colors of patches constituting a color chart, wherein a plurality of patches each having a predetermined color is arranged and same gray patches are arranged at a plurality of places, are read;

a profile producing step of producing a profile defining an association between coordinate points on a color space depending on a device performing at least one of input and output of an color image and coordinate points on a color space independent of said device in accordance with the read data obtained by said data obtaining step; and a performance verification step of verifying a performance of said device in accordance with read data involved in the gray patches of the read data obtained by said data obtaining step.

To achieve the above-mentioned object, the present invention provides a second profile producing method comprising:

a data obtaining step of obtaining read data in which colors of patches of a plurality of chart sheets constituting a color chart, wherein a plurality of patches each having a predetermined color is arranged on each chart sheet and same gray patches are arranged at common places of the plurality of chart sheets, are read;

a profile producing step of producing a profile defining an association between coordinate points on a color space depending on a device performing at least one of input and output of an color image and coordinate points on a color space independent of said device in accordance with the read data obtained by said data obtaining step; and a performance verification step of verifying a performance of said device in accordance with read data involved in the gray patches of the read data obtained by said data obtaining step.

To achieve the above-mentioned object, the present invention provides a third profile producing method comprising:

a data obtaining step of obtaining read data in which colors of patches constituting a color chart, wherein a plurality of patches each having a predetermined color is arranged and specific color patches each having a specific color for color accuracy verification are arranged, are read;

a profile producing step of producing a profile defining an association between coordinate points on a color space depending on a device performing at least one of input and output of an color image and coordinate points on a color space independent of said device in accordance with the read data obtained by said data obtaining step; and an accuracy verification step of verifying an accuracy of said profile in accordance with read data involved in the specific color patches of the read data obtained by said data obtaining step.

To achieve the above-mentioned object, the present invention provides a fourth profile producing method comprising:

a data obtaining step of obtaining read data in which colors of patches constituting a color chart, wherein a plurality of patches each having a predetermined color is arranged and regarding main patches of the plurality of patches, patches having relatively high saturation of colors are arranged outside more than patches having relatively low saturation of colors, are read; and a profile producing step of producing a profile defining an association between coordinate points on a color space depending on a device performing at least one of input and output of an color image and coordinate points on a color space independent of said device in accordance with the read data obtained by said data obtaining step.

To achieve the above-mentioned object, the present invention provides a profile producing program storage medium storing a profile producing program, which causes a computer to serve as any one of the first to fourth profile producing apparatuses mentioned above when the profile producing program storage medium is incorporated into the computer.

DETAILED DESCRIPTION OF PREFERRED EMBODIMENTS

Embodiments of the present invention will be described with reference to the accompanying drawings.

Figure 1:
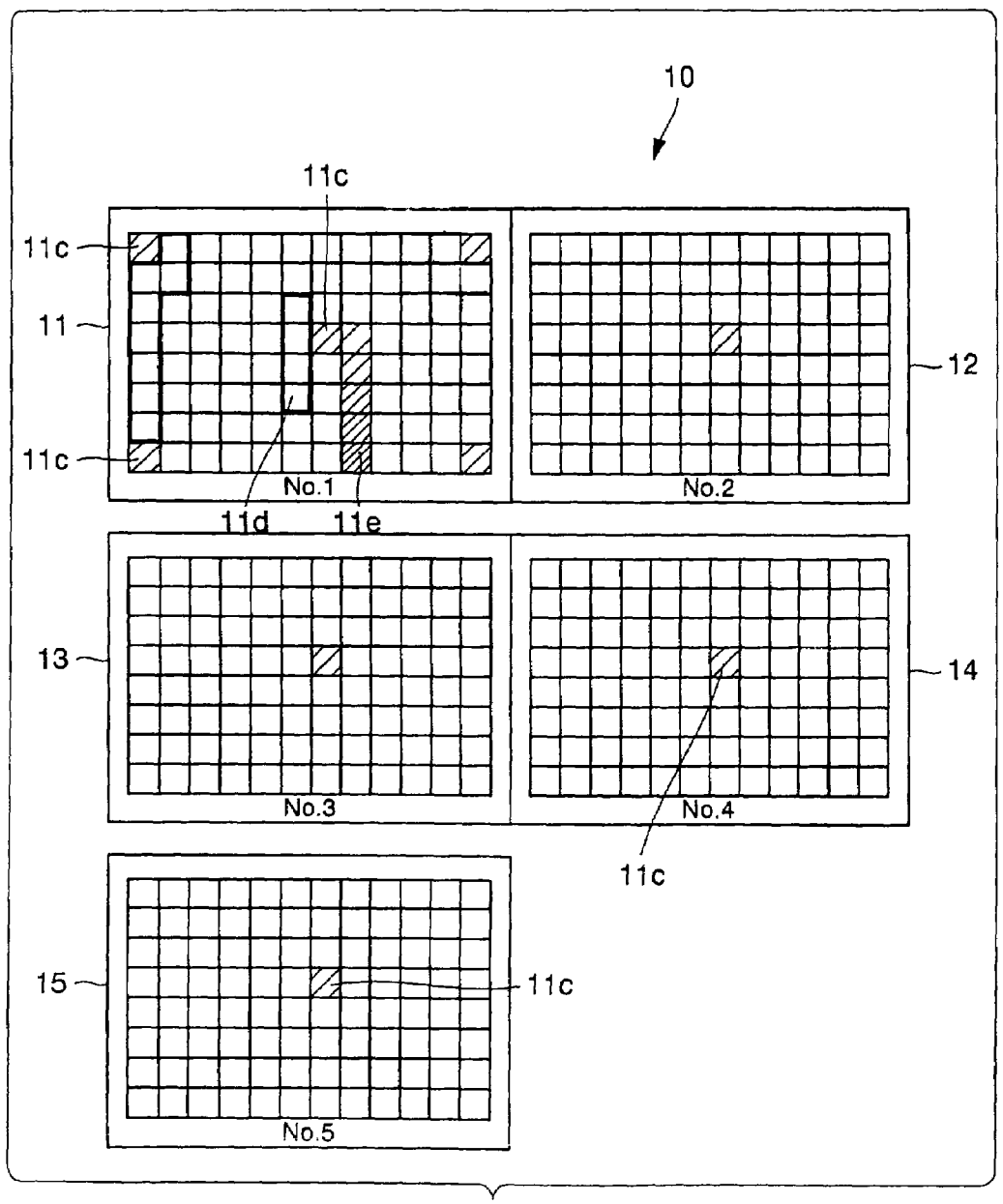
FIG. 1 is a view showing an example of a color chart referred to in the present invention.

FIG. 1 is view showing an example of a color chart referred to in the present invention.

A set of color chart 10 consists of five chart sheets of a first sheet 11 to a fifth sheets 15. Those five chart sheets 11, 12, 13, 14 and 15 are sequentially read from the first sheet 11. Patches of each of the chart sheets 11, 12, 13, 14 and 15 are sequentially read from top to bottom on each column one by one starting from the column of the left.

With respect to the first sheet 11, there are provided common gray patches 11c on total five places of the center of the chart sheet and four corners. With respect to each of the second sheet 12 to the fifth sheet 15, there is provided the common gray patch 11c on the center of the associated chart sheet. Those common gray patches 11c are used for a verification of a device performance.

The first sheet 11 is also provided with patches 11d having a specific color for verifying a color precision of a profile. A series of gray patches 11e, which is used for a calibration for a gray axis, is placed in the vicinity of the center of the first sheet 11.

With respect to patches arranged on each of the chart sheets 11, 12, 13, 14 and 15, which constitute the color chart 10, except for restricted exceptions such as gray patches for verification of a device performance, patches having relatively higher color in saturation are disposed more outside as compared with patches having relatively lower color in saturation. Thus, the patches of color, which are sensitive in fluctuation of input and output accuracy of color, are located at the places which are small in fluctuation, and thereby suppressing the effect of the fluctuation.

Figure 2:
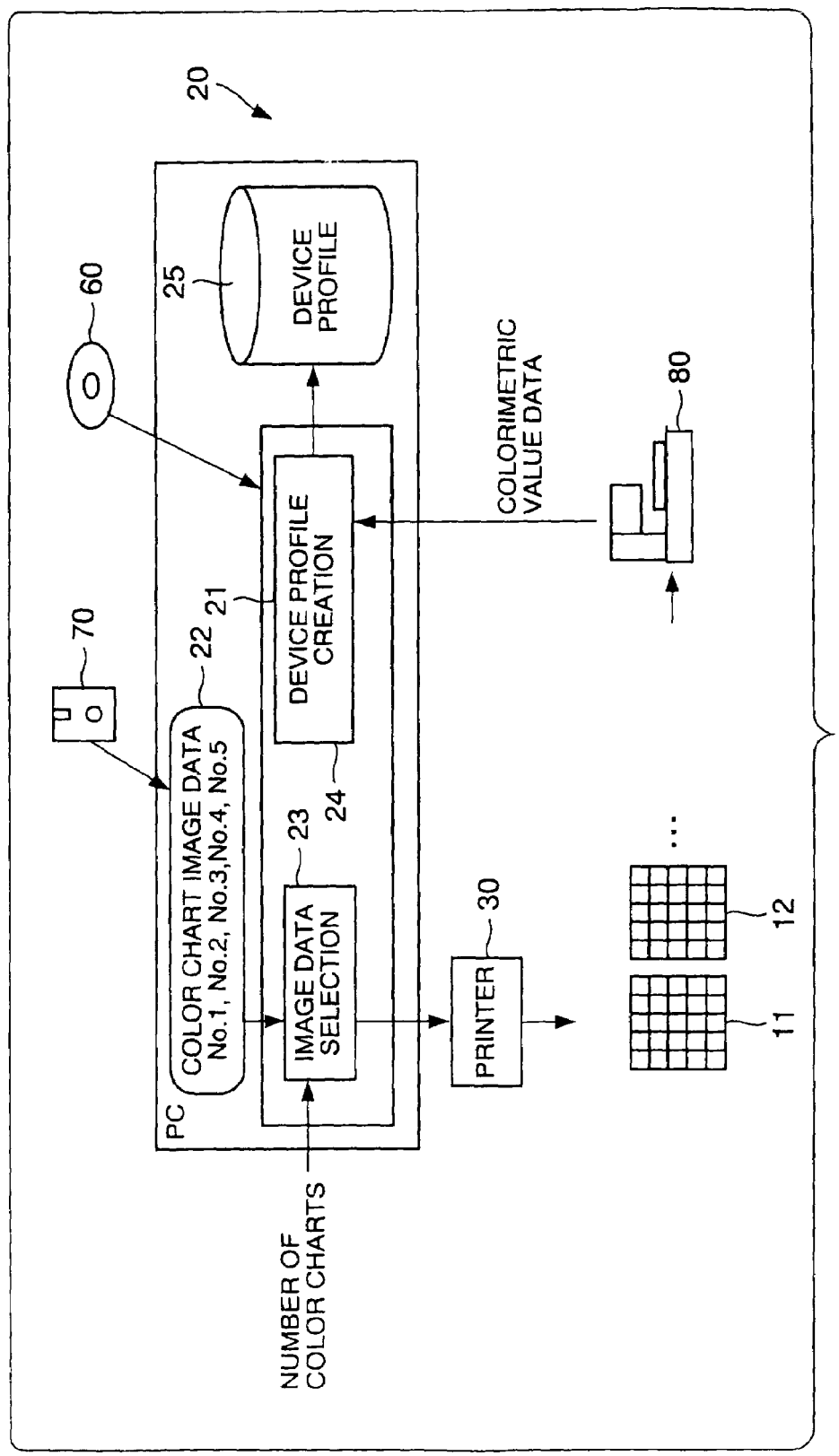
FIG. 2 is a view showing an embodiment of a profile producing apparatus of the present invention.
Figure 3:
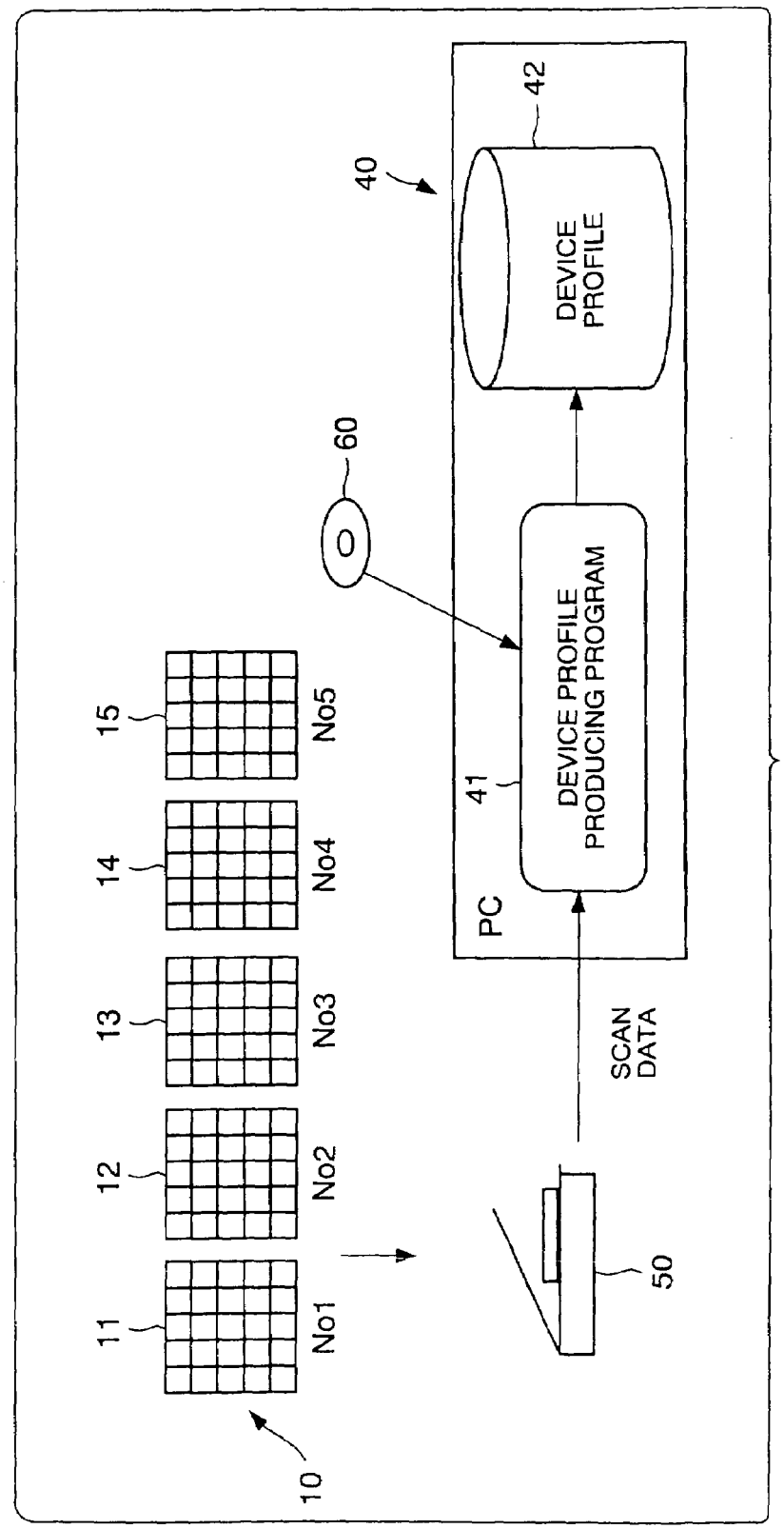
FIG. 3 is a view showing an alternative embodiment of a profile producing apparatus of the present invention.

FIG. 2 is a view showing an embodiment of a profile producing apparatus of the present invention. FIG. 3 is a view showing an alternative embodiment of a profile producing apparatus of the present invention.

A profile producing apparatus 20 shown in FIG. 2 creates a profile for a printer 30. A profile producing apparatus 40 shown in FIG. 3 creates a profile for a printer 50.

Here, each of the profile producing apparatuses 20 and 40 shown in FIGS. 2 and 3 is constituted of a personal computer. The personal computers are loaded with CD-ROMs 60 storing profile producing programs 21 and 41 which cause the personal computers as the profile producing apparatuses 20 and 40, respectively, so that the profile producing programs 21 and 41 are up loaded onto the associated personal computers, respectively. When the profile producing programs 21 and 41 are executed, the associated personal computers operate as an embodiment of a profile producing apparatus of the present invention.

The personal computer, which constitutes the profile producing apparatus 20 shown in FIG. 2, is loaded with a floppy disk 70 storing chart image data 22 representative of the color chart 10 shown in FIG. 1, so that the chart image data 22 is up loaded onto the personal computer.

Hereinafter, there will be described a procedure of producing a profile using the profile producing apparatuses 20 and 40.

On the profile producing apparatus 20 shown in FIG. 2, of a plurality of chart sheets (here five sheets) constituting a color chart, the number of chart sheets necessary is designated. For example, the first sheet to the third sheet are necessary, "three sheets" is designated. This number of sheets is decided and designated by a user in accordance with performance of the printer 30. More in detail, for a printer that is lower in performance and larger in distortion of color, a relatively small number of sheets is designated. On the other hand, for a printer that is higher in performance and smaller in distortion of color, a relatively large number of sheets is designated.

The profile producing apparatus 20 designated in the number of chart sheets selects chart image data representative of chart sheets of the corresponding designated number in accordance with a selection routine 23 of the profile producing program 21, and outputs the same to the printer 30. The printer 30 outputs for example the first sheet 11 in accordance with the chart image data.

Thus, a color measurement machine 80 measures colors of the respective patches arranged on the chart sheets 11, 12, . . . outputted by the printer 30, so that colorimetric values are obtained by the number corresponding to performance of the printer 30. Colorimetric data representative of the calorimetric values is fed to the profile producing apparatus 20 in accordance with a profile producing routine 24 of the profile producing program 21, so that a profile 25 for the printer 30 is produced in accordance with the calorimetric data. The profile producing routine 24 will be described later.

In the event that the profile producing apparatus 40 shown in FIG. 3 is used to create a profile, first, a user selects chart sheets of the number according to performance of the scanner 50, of five sheets of chart sheets 11, 12, 13, 14 and 15 constituting the color chart 10 shown in FIG. 1. And the scanner 50 reads the selected chart sheets in turn from the first sheet 11 so that scan data for patches of the number corresponding to the performance of the scanner 50 are obtained. Those scan data are fed to the profile producing apparatus 40 in accordance with a profile producing routine of the profile producing program 41, so that a profile 42 for the scanner 50 is produced in accordance with the scan data.

Next, there will be described a profile producing routine. Here, it is assumed that a profile of a LUT form is produced.

Figure 4:
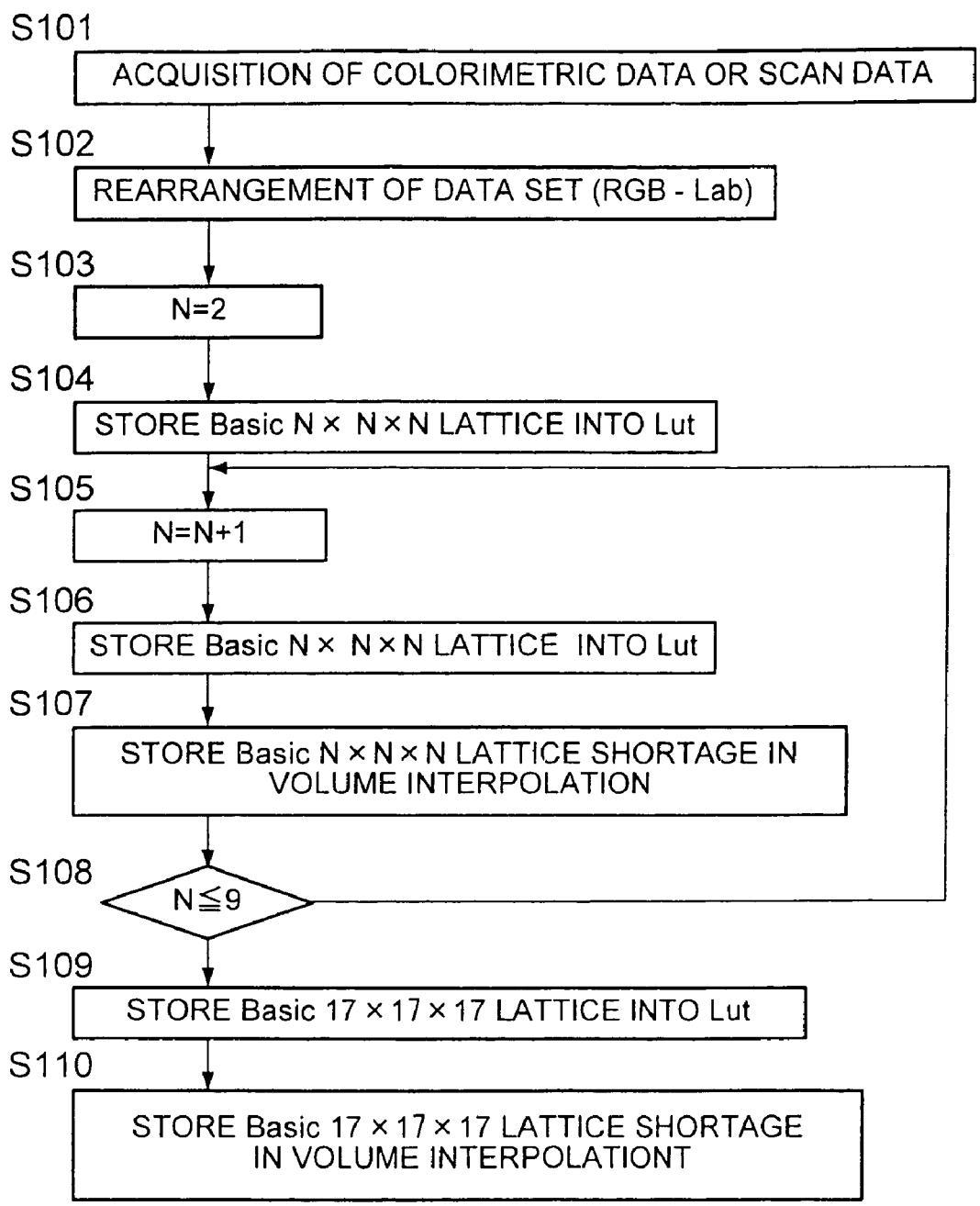
FIG. 4 is a flowchart useful for understanding a profile producing routine.

FIG. 4 is a flowchart useful for understanding a profile producing routine.

When the profile producing routine is initiated, first, a series of colorimetric data or scan data is obtained (a step S101). The series of calorimetric data or scan data is rearranged in such a manner that it is convenient for creation of a profile (a step S102). Here, there is assumed a three-dimensional lattice in a color space represented in form of a cube-like shaped three-dimensional space from coordinate value (0, 0, 0) to coordinate values (255, 255, 255), and it is assumed that calorimetric data and the like for patches associated with lattice points on the lattice are obtained. As the color space, there are considered an RGB color space, a CMY color space, and another color space. However, here, for the sake of convenience of explanation, as the color space, the RGB color space is assumed. A lattice assumed on the RGB color space is referred to as N×N×N lattice (N=2–9, 17). 2×2×2 lattice is a lattice in which lattice points are represented by coordinate values (R, G, B) wherein elements R, G and B have any one of the value "0" and the value "255". That is, the lattice points in the 2×2×2 lattice exist 8 pieces, which correspond to 8 vertexes of a cube representative of an RGB color space.

3×3×3 lattice is a lattice in which lattice points are represented by coordinate values (R, G, B) wherein elements R, G and B have any one of the value "0", the value "140" and the value "255". However, hereinafter, in order to avoid an overlap of the lattice points in notion, the lattice points, wherein one or more elements of the elements R, G and B of the coordinate values (R, G, B) have the value "140", are referred to as "lattice points of 3×3×3 lattice.

Hereinafier, in a similar fashion, 4×4×4 lattice is a lattice in which lattice points are represented by coordinate values (R, G, B) wherein elements R, G and B have any one of the value "0", the value "140", the value "210" and the value "255". The lattice points, wherein one or more elements of the elements R, G and B of the coordinate values (R, G, B) have the value "210", are referred to as "lattice points of 4×4×4 lattice."

5×5×5 lattice is a lattice in which lattice points are represented by coordinate values (R, G, B) wherein elements R, G and B have any one of the value "0", the value "70", the value "140", the value "210" and the value "255". The lattice points, wherein one or more elements of the elements R, G and B of the coordinate values (R, G, B) have the value "70", are referred to as "lattice points of 5×5×5 lattice."

6×6×6 lattice is a lattice in which lattice points are represented by coordinate values (R, G, B) wherein elements R, G and B have any one of the value "0", the value "70", the value "140", the value "175", the value "210" and the value "255". The lattice points, wherein one or more elements of the elements R, G and B of the coordinate values (R, G, B) have the value "175", are referred to as "lattice points of 6×6×6 lattice."

7×7×7 lattice is a lattice in which lattice points are represented by coordinate values (R, G, B) wherein elements R, G and B have any one of the value "0", the value "70", the value "105", the value "140", the value "175", the value "210" and the value "255". The lattice points, wherein one or more elements of the elements R, G and B of the coordinate values (R, G, B) have the value "105", are referred to as "lattice points of 7×7×7 lattice. 8×8×8 lattice is a lattice in which lattice points are represented by coordinate values (R, G, B) wherein elements R, G and B have any one of the value "0", the value "70", the value "105", the value "140", the value "175", the value "210", the value "240" and the value "255". The lattice points, wherein one or more elements of the elements R, G and B of the coordinate values (R, G, B) have the value "240", are referred to as "lattice points of 8×8×8 lattice.

9×9×9 lattice is a lattice in which lattice points are represented by coordinate values (R, G, B) wherein elements R, G and B have any one of the value "0", the value "35", the value "70", the value "105", the value "140", the value "175", the value "210", the value "240" and the value "255". The lattice points, wherein one or more elements of the elements R, G and B of the coordinate values (R, G, B) have the value "35", are referred to as "lattice points of 9×9×9 lattice.

17×17×17 lattice is a lattice in which lattice points are represented by coordinate values (R, G, B) wherein elements R, G and B have any one of the value "0", the value "17", the value "35", the value "52", the value "70", the value "87", the value "105", the value "122", the value "140", the value "157", the value "175", the value "192", the value "210", the value "225", the value "240", the value "247" and the value "255". The lattice points, which do not overlap with the lattice points of the abovementioned 2×2×2 lattice to 9×9×9 lattice, are referred to as "lattice points of 17×17×17 lattice." It is assumed that with respect to patches associated with the lattice points of 17×17×17 lattice, only patches associated with the lattice points of a part of the periphery of the gray axis are prepared.

When the patches of the color chart shown in FIG. 1 are read in the reading order as mentioned above, as a general rule, the patches associated with the lattice points of the 2×2×2 lattice, . . . the patches associated with the lattice points of the 9×9×9 lattice, and the patches associated with the lattice points of the 17×17×17 lattice are read in the named order to obtain colorimetric data and scan data. This order is convenient for creation of the profile.

However, on the color chart shown in FIG. 1, there are disposed the above-mentioned common gray patches, a series of gray patches and patches having specific colors. For this reason, while patches associated with the lattice points are sequentially read, patches not associated with the lattice points may be read. In the step S102, sets of colorimetric data and scan data and coordinate values are created, and the sets are rearranged, so that sets not associated with the lattice points are distinguished from sets associated with the lattice points.

Thus, when the data sets are rearranged, first, the data sets associated with the lattice points of the 2×2×2 lattice are stored in a storage area for a profile in form of a part of LUT constituting the profile (a step S103 and a step S104).

FIGS. 5(A)–5(E) are views showing states that data sets are stored.

Figure 5A:
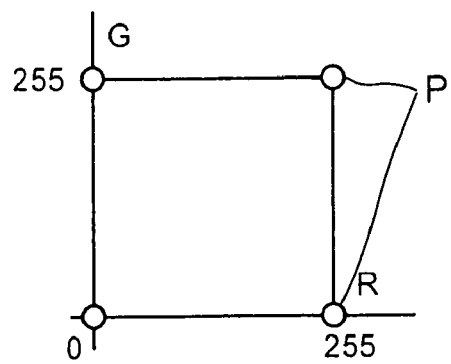
FIGS. 5(A)–5(E) are views showing states that data sets are stored.

FIGS. 5(A)–5(E) show RGB spaces on a two-dimensional basis. FIG. 5(A) shows 2×2×2 lattice. The lattice points of the 2×2×2 lattice are marked with white circles. The white circle indicates that data set associated with the lattice point is stored as a part of the LUT.

When data sets associated with the lattice points of the 2×2×2 lattice are stored in the step S103 and the step S104 in FIG. 4, next, a value of the integer N is stepped up (a step S105), data sets associated with lattice points of N×N×N lattice are stored in the above-mentioned storage area (a step S106).

Figure 5B:
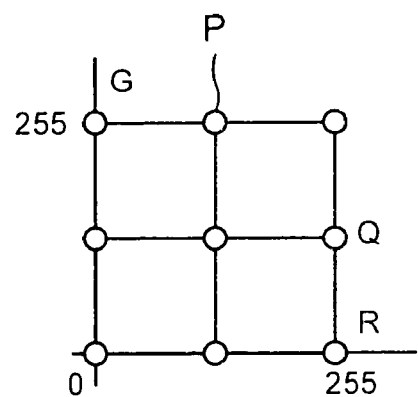

FIG. 5(B) shows 3×3×3 lattice. The lattice points of the 3×3×3 lattice, except for a part, are marked with white circles. A lattice point Q, which is not marked with the white circle, indicates that the data set is insufficient.

In the event that only a part of chart sheets of a plurality of chart sheets constituting a color chart is read, it is considered that reading is terminated on the way of a series of patches associated with the lattice points of the N×N×N lattice. In this case, data sets associated with a part of lattice points would be insufficient.

In the event that data sets become insufficient in the step S106 in FIG. 4, the data sets of the insufficient portion are computed and stored by a volume interpolation based on the data sets which are already stored (a step S107). And if the value of N is less than 9 (a step S108: yes), the step S105 to the step S107 are repeated, so that data sets are sequentially stored up to the data sets associated with the lattice points of the 9×9×9 lattice.

Figure 5C:
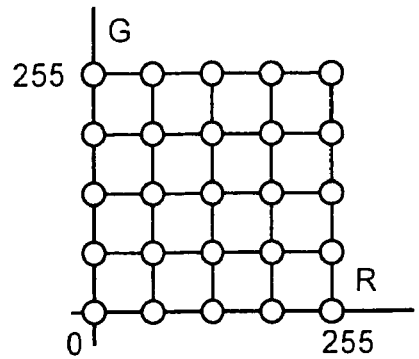

FIG. 5(C) conceptually shows a state that the data sets associated with the lattice points of the N×N×N lattice, where N=9, are stored in its entirety.

In the step S108 of FIG. 4, when it is decided that the value of N reaches 9 or more, then the data sets associated with the lattice points of the 17×17×17 lattice are stored (a step S109).

Figure 5D:
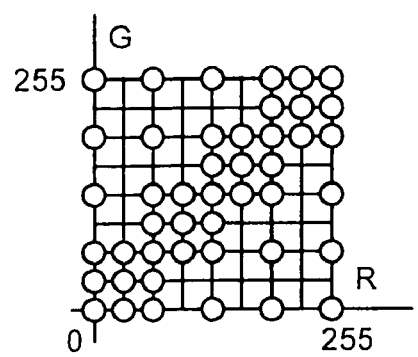

FIG. 5(D) conceptually shows a state that the data sets associated with the lattice points of the 17×17×17 lattice, wherein other portions except for a periphery of the gray axis are insufficient in data sets. The data sets of the insufficient portions are computed and stored by a volume interpolation in a similar fashion to that as mentioned above (a step S110).

Figure 5E:
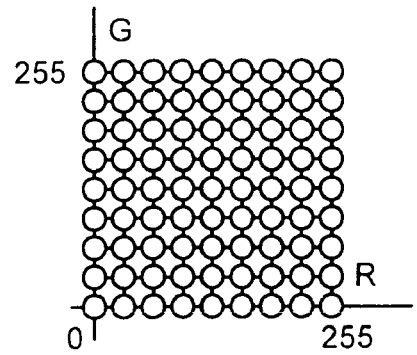

FIG. 5(E) conceptually shows a state that the data sets associated with the lattice points of the 17×17×17 lattice are stored in its entirety.

The LUT, which is created in such a manner that the data sets are stored, as mentioned above, is used as a profile.

Hereinafter, there will be described details of a rearrangement of data sets in the step S102 of FIG. 4.

Figure 6:
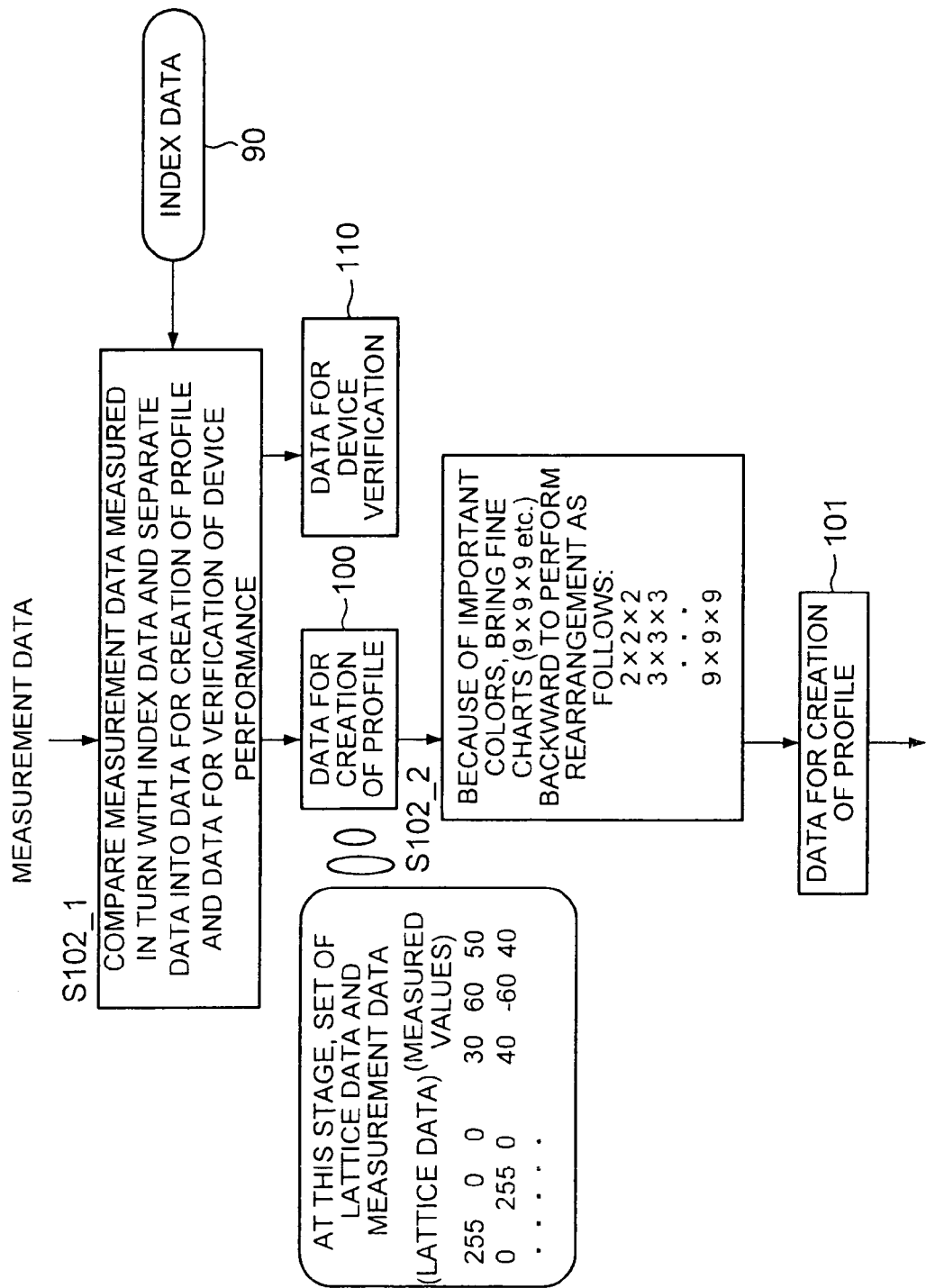
FIG. 6 is a flowchart useful for understanding a rearrangement when a profile for a printer is produced.

FIG. 6 is a flowchart useful for understanding a rearrangement when a profile for a printer is produced.

In the rearrangement, first, index data representative of an arrangement of patches constituting a color chart is associated with a series of colorimetric data so that the above-mentioned data sets are created (a step S102_1).

Figure 7:
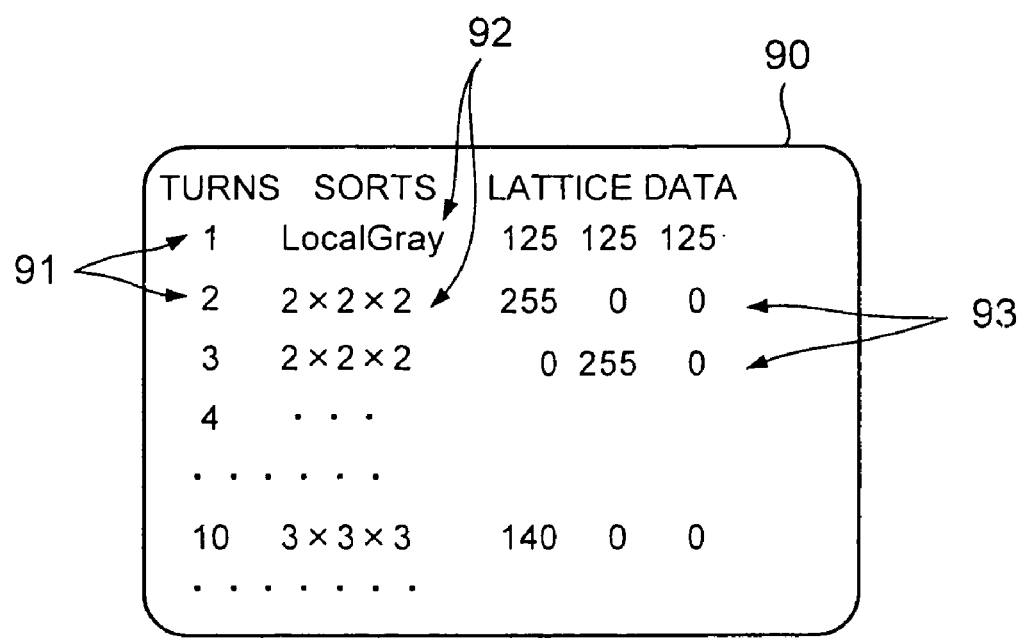
FIG. 7 is a view showing an example of index data.

FIG. 7 is a view showing an example of index data.

In index data 90, numbers 91 representative of arrangement order or reading order of patches, sorts 92 of the patches and coordinate values (lattice data) 93 of the color spaces with which the patches are associated, are associated with one another. And when the sorts 92 of the patches are referred to, the above-mentioned common gray patches, a series of gray patches and patches having specific colors are discriminated from among the patches arranged on the color chart. Of course, the association between the numbers 91 and the coordinate values (lattice data) 93 reflects that in the color chart 10 shown in FIG. 1, patches of colors relatively high in saturation are disposed outside more than patches of colors relatively low in saturation.

In the step S102_1 shown in FIG. 6, the coordinate value 93 is combined with the calorimetric data in accordance with the number 91 of the index data 90 to create data sets. And the data sets are classified into data sets 100 for creation of a profile and data sets 110 for verification of a device and the like in accordance with the sort 92 of patches. A method of utilization of data sets 110 for verification of a device and the like will be described later.

The data sets 100 for creation of a profile, which are classified in the step S102_1, are, as a general rule, arranged in block in form of a group on each lattice point of the N×N×N lattice. But in some case, it may happen that some important colors are exceptionally disposed forward. In this case, a rearrangement is performed in accordance with the number 91 and the sort 92 of the index data 90 (a step S102_2). The data sets 101 for creation of a profile thus rearranged are used to produce a profile as mentioned above.

Figure 8:
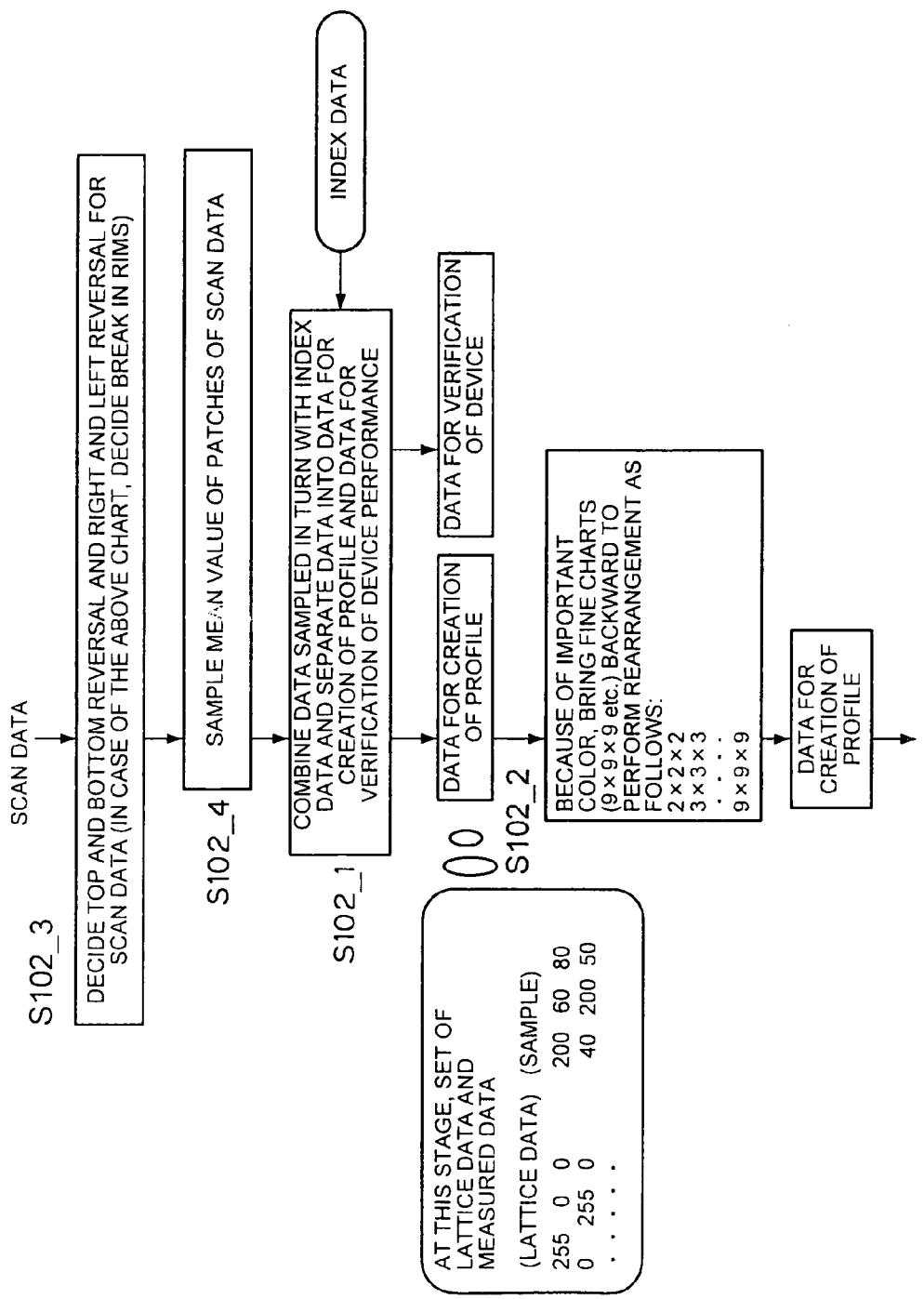
FIG. 8 is a flowchart useful for understanding a rearrangement when a profile for a scanner is produced.

FIG. 8 is a flowchart useful for understanding a rearrangement when a profile for a scanner is produced.

In a rearrangement when a profile for a scanner is produced, first, the top and the bottom and the right and left of the color chart are decided in accordance with the scan data and as the need arises reversion of the top and the bottom and reversion of the right and left are applied (a step S102_3). Further, the mean value of the scan data, wherein a plurality of points are read on one patch, is sampled (a step S102_4).

Thereafter, the same procedures as the step S102_1 and the step S102_2 shown in FIG. 6 are executed.

Next, there will be described a method of utilizing the data sets 110 for verification of a device and the like. Here, it will be explained assuming a profile producing apparatus having the common function to the profile producing apparatuses 20 and 40.

Figure 9:
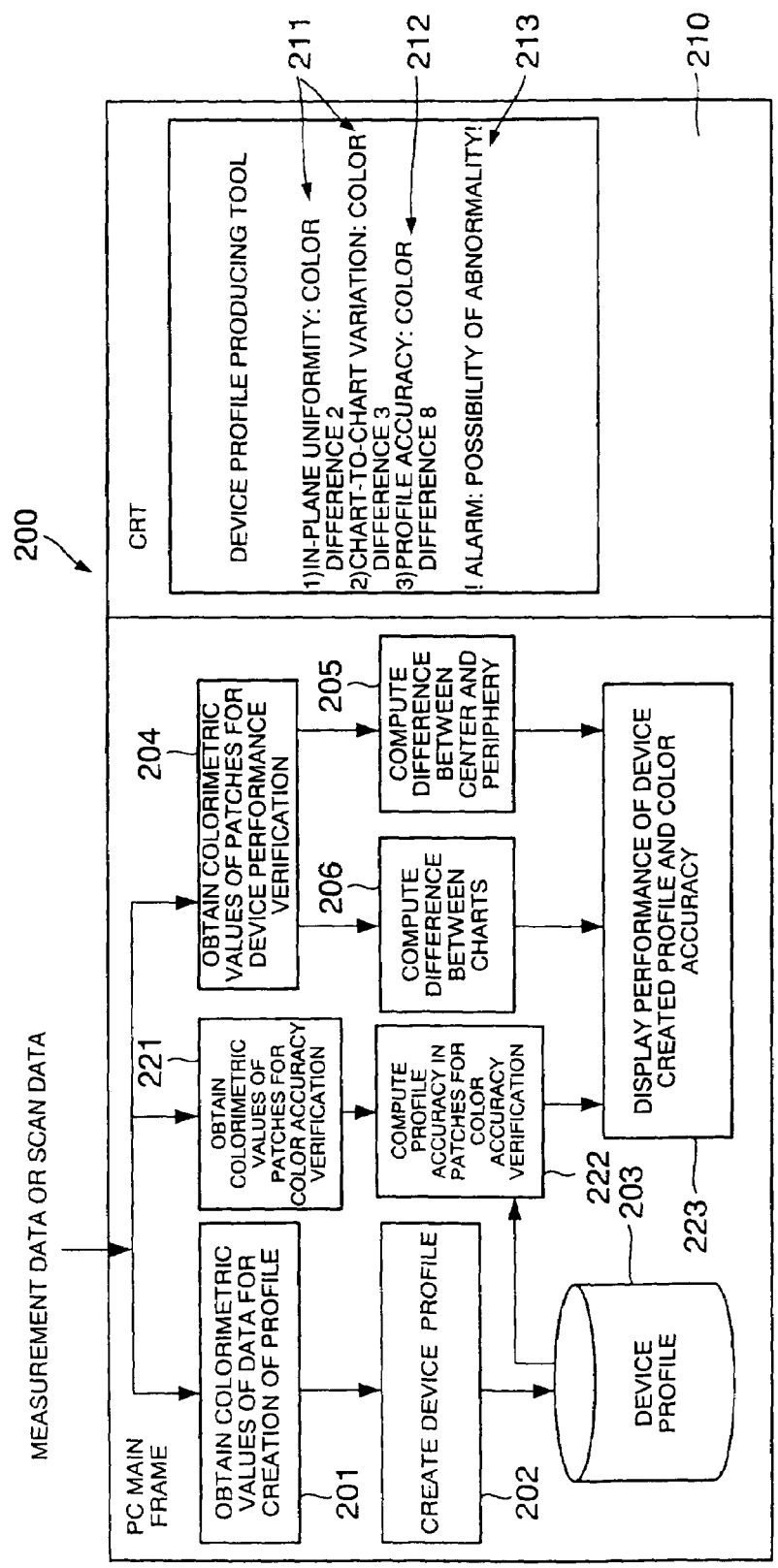
FIG. 9 is a view useful for understanding a method of utilizing patches for device performance verification and patches for color accuracy verification.

FIG. 9 is a view useful for understanding a method of utilizing patches for device performance verification and patches for color accuracy verification.

A profile producing apparatus 200 shown in FIG. 9 performs, in a similar fashion to that of the above-mentioned explanation, an acquisition 201 of colorimetric data or scan data and a creation 202 of a profile, so that a profile 203 for a printer or a scanner is created.

The profile producing apparatus 200 performs an acquisition of colorimetric data and the like of patches for device performance verification in parallel to creation of the above-mentioned profile, so that a color difference computation 205 of patches for verification among a plurality of points in a chart sheet and a color difference computation 206 of patches for verification among a plurality of charts are executed. And a performance display 223, wherein the computed color differences are used in form of the device performance, is performed, and values 211 of the computed color differences 211 are displayed on a CRT 210.

Further, the profile producing apparatus 200 executes an acquisition 221, 204 of colorimetric data and the like of patches for color accuracy verification of a profile further in parallel to creation of the above-mentioned profile and device performance verification, so that an accuracy computation 222 is performed in accordance with the obtained colorimetric data and the like and the created profile 203. And a display 223 of profile accuracy is performed, so that a value 212 of color difference representative of the profile accuracy is displayed on the CRT 210 together with values 211 of color differences representative of device performances. In the event that the value 212 of color difference representative of the profile accuracy is larger than the values 211 of color differences representative of device performances, an alarm message 213 is also displayed.

A user decides whether a suitable profile is produced in accordance with device performance and color accuracy displayed on the CRT 210, and as a need arises, alters the designated number of chart sheets, and can instruct doing over again creation of the profile. Alternatively, it is acceptable that data representative of device performances and color accuracy is simply appended to the created profile.

Next, there will be described an alternative embodiment of the present invention.

Figure 10:
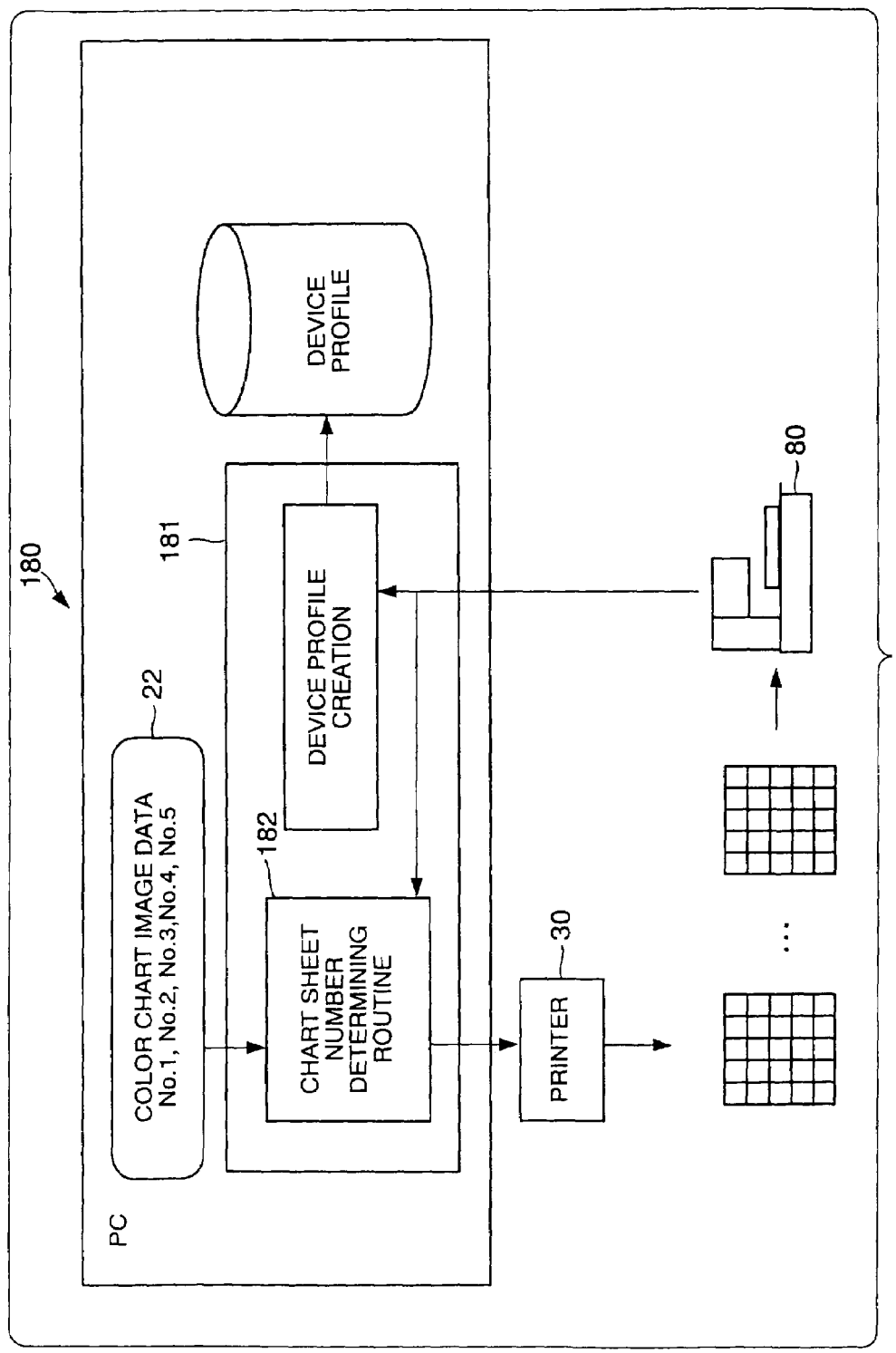
FIG. 10 is an alternative embodiment of the present invention.

FIG. 10 is an alternative embodiment of the present invention.

A profile producing apparatus 180 shown in FIG. 10 is for producing a profile for the printer 30, similar to the profile producing apparatus 20 shown in FIG. 2.

According to the profile producing apparatus 20 shown in FIG. 2, a user designates the number of chart sheets used in creation of a profile of chart sheets constituting a color chart. On the other hand, according to the profile producing apparatus 180 shown in FIG. 10, the number of chart sheets is automatically computed.

According to the profile producing apparatus 180 shown in FIG. 10, first, of the chart image data 22, a predetermined number of sheets (e.g. two sheets) of image data is fed to the printer 30, so that printer 30 outputs the predetermined number of chart sheets. A color measurement machine 80 measures colors of patches of the chart sheets. A chart sheet number determining routine 182 of a profile producing program 181 receives the calorimetric data.

Figure 11:
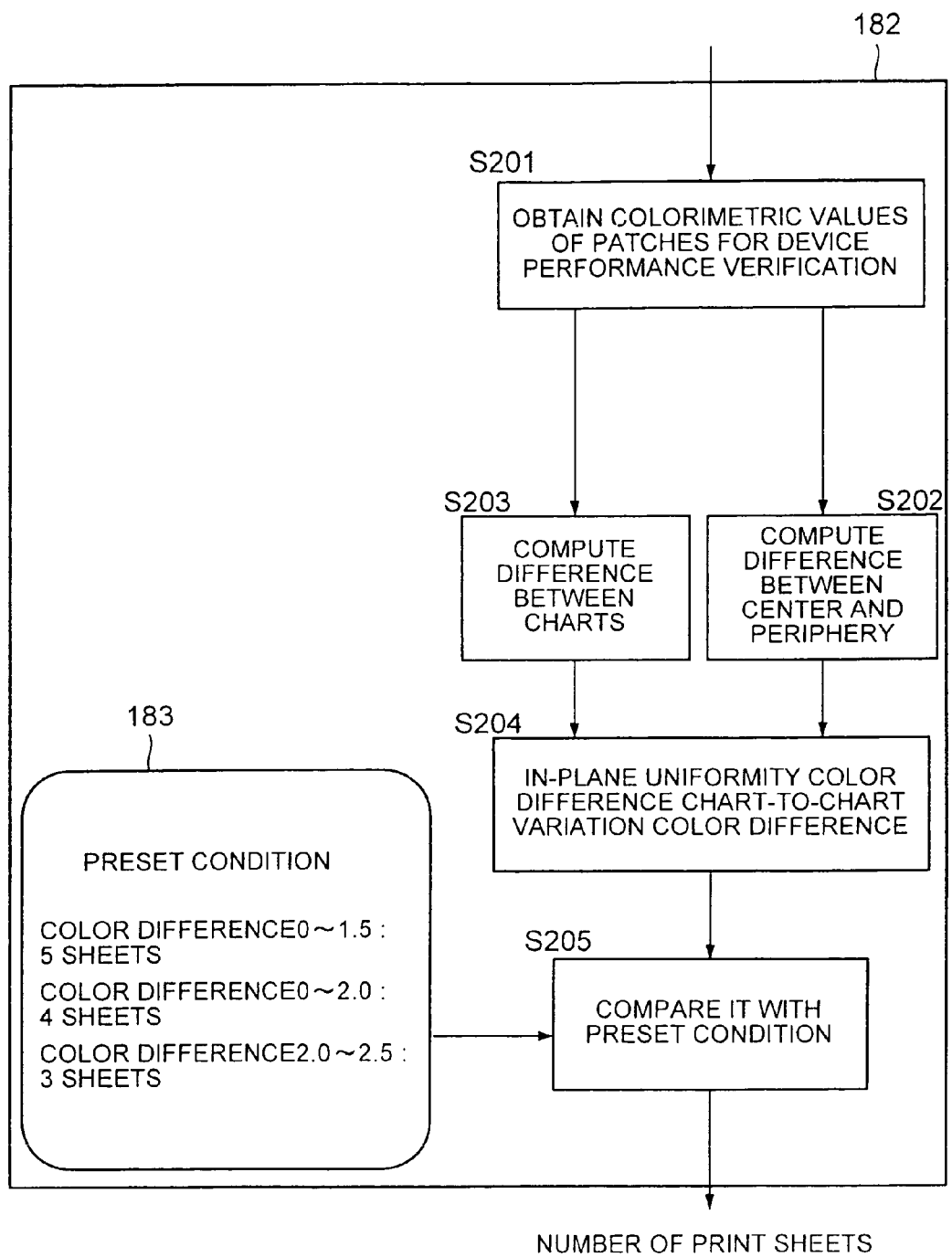
FIG. 11 is a flowchart useful for understanding a decision routine for the number of sheets shown in FIG. 10.

FIG. 11 is a flowchart useful for understanding a decision routine for the number of sheets shown in FIG. 10.

The chart sheet number determining routine 182 obtains colorimetne data representative of colors of the common gray patches 11c shown in FIG. 1 for device performance verification, of the colorimetric data obtained from the color measurement machine (a step S201). And there are determined differences of colorimetric data between the center of one chart sheet and the gray patches 11c disposed at the four corners and differences of colorimetric data of the gray patches 11c between mutually different chart sheets (step S202 and step S203). Color difference representative of uniformity of color inside the chart sheet and color difference of color variation between chart sheets are computed in accordance with the differences thus determined (a step S204). Thus, a stability of colors in an in-plane direction and a stability of colors for the lapse of time at the time when the printer 30 outputs an image are determined. The computed color difference is compared (step S205) with a preset condition 183 in which the association between color differences and the number of necessary chart sheets is defined, so that the number of necessary chart sheets is determined. Of the determined number of chart sheets, chart image data corresponding to the chart sheets, which are not yet outputted from the printer 30, is fed to the printer 30 so that the printer 30 additionally outputs the chart sheets.

Thereafter, the profile is produced in the same procedure as the profile producing apparatus 20 shown in Thus, utilization of the patches for device verification makes it possible to produce a profile suitable for a performance of a printer.

Figure 12:
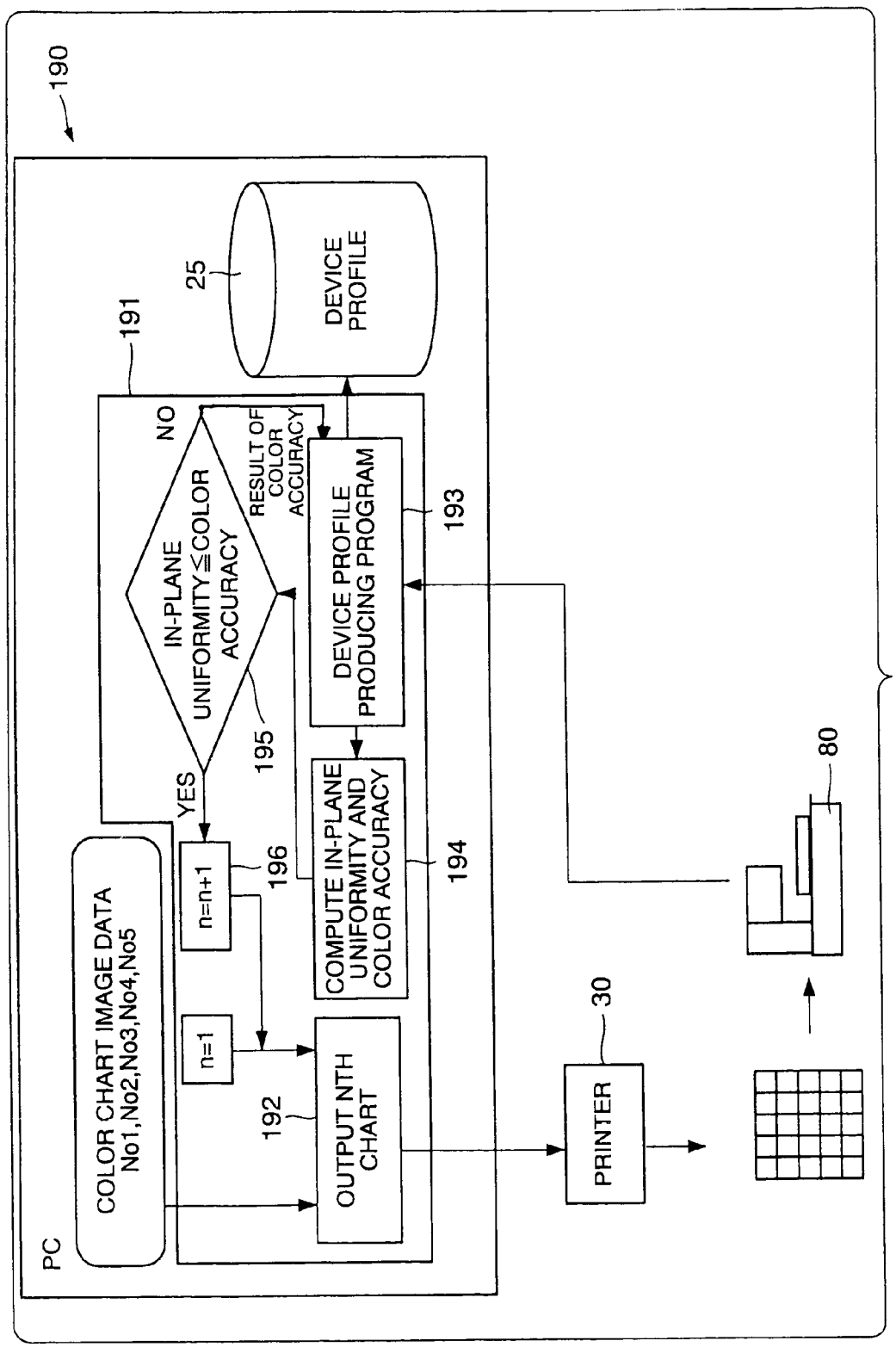
FIG. 12 is a further alternative embodiment of the present invention.

FIG. 12 is a further alternative embodiment of the present invention.

In a profile producing apparatus 190 shown in FIG. 12, first, a selection output 192 of image data corresponding to the first sheet of the chart image data 22 is performed so that the image data is fed to the printer 30. The printer 30 outputs the first sheet, and the color measurement machine measures colors of patches of the outputted first sheet. In a profile producing routine 193 of a profile producing program 191, the profile producing apparatus 190 receives colorimetric data, and the profile 25 for the printer 30 is temporarily created.

Next, a computation 194 of uniformity of color in-plane of the chart sheet is executed in accordance with calorimetric data for the device performance verification as mentioned above, of the calorimetric data received by the profile producing apparatus 190. Further, the computation 194 of color accuracy of the temporary profile 25 is also executed in accordance with calorimetric data of patches having specific colors for verifying color accuracy of the profile, of the calorimetric data received by the profile producing apparatus 190. Results of those computations 194 are used to perform a comparison decision 195 between the uniformity of color and the color accuracy. When it is decided that dispersion in color in-plane is smaller than the color accuracy, renewal 196 of the chart sheet number is performed so that the selection output 192 of image data corresponding to the chart sheet indicated by the new number is performed. On the other hand, when the comparison decision 195 decides that dispersion in color in-plane is larger than the color accuracy, the profile 25, which is temporarily created, is saved as a decided profile and the operation is terminated.

Also in the profile producing apparatus according to the present embodiment, utilization of patches for device verification makes it possible to produce a profile suitable for a performance of a printer.

Figure 13:
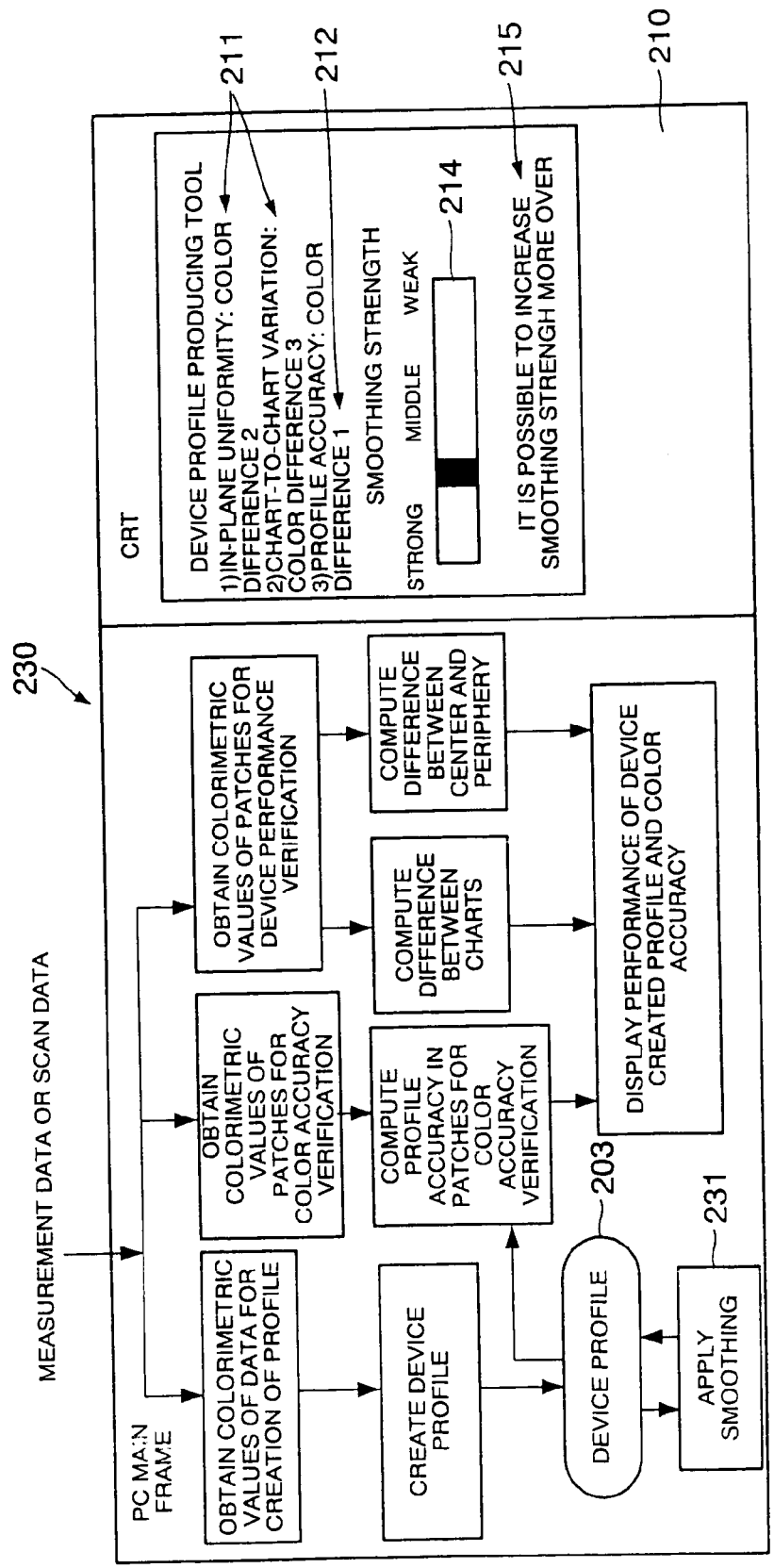
FIG. 13 is a still further alternative embodiment of the present invention.

FIG. 13 is a still further alternative embodiment of the present invention.

A profile producing apparatus 230 shown in FIG. 13 is similar to the profile producing apparatus 200 shown in FIG. 10. Here, there will be described only different points.

The profile producing apparatus 230 shown in FIG. 13 has a function of applying smoothing 231 to a profile 203 to be produced in the manner as mentioned above. The strength of smoothing 231 is set up in such a manner that a user operates a slider bar 214 displayed on a CRT 210.

While an application of the smoothing 231 to the profile 203 generally deteriorates color accuracy, it is preferable to apply so a strong smoothing as much as possible in such a limit that the value 212 of the color difference representative of the profile accuracy is below the values 211 of the color differences representative of the device performance, even after the smoothing 231 is applied.

For this reason, according to the profile producing apparatus 230 shown in FIG. 13, a sentence 215 that the strength of the smoothing is increased or a sentence that the strength of the smoothing is over the limit is displayed on the CRT 210 in accordance with whether the value 212 of the color difference representative of the profile accuracy is below the value 211 of the color difference representative of the device performance.

A user can perform resetting of strength of the smoothing taking into consideration the sentences displayed on the CRT 210, and thereby producing a profile taking into consideration distortion and fluctuation of colors.

Figure 14:
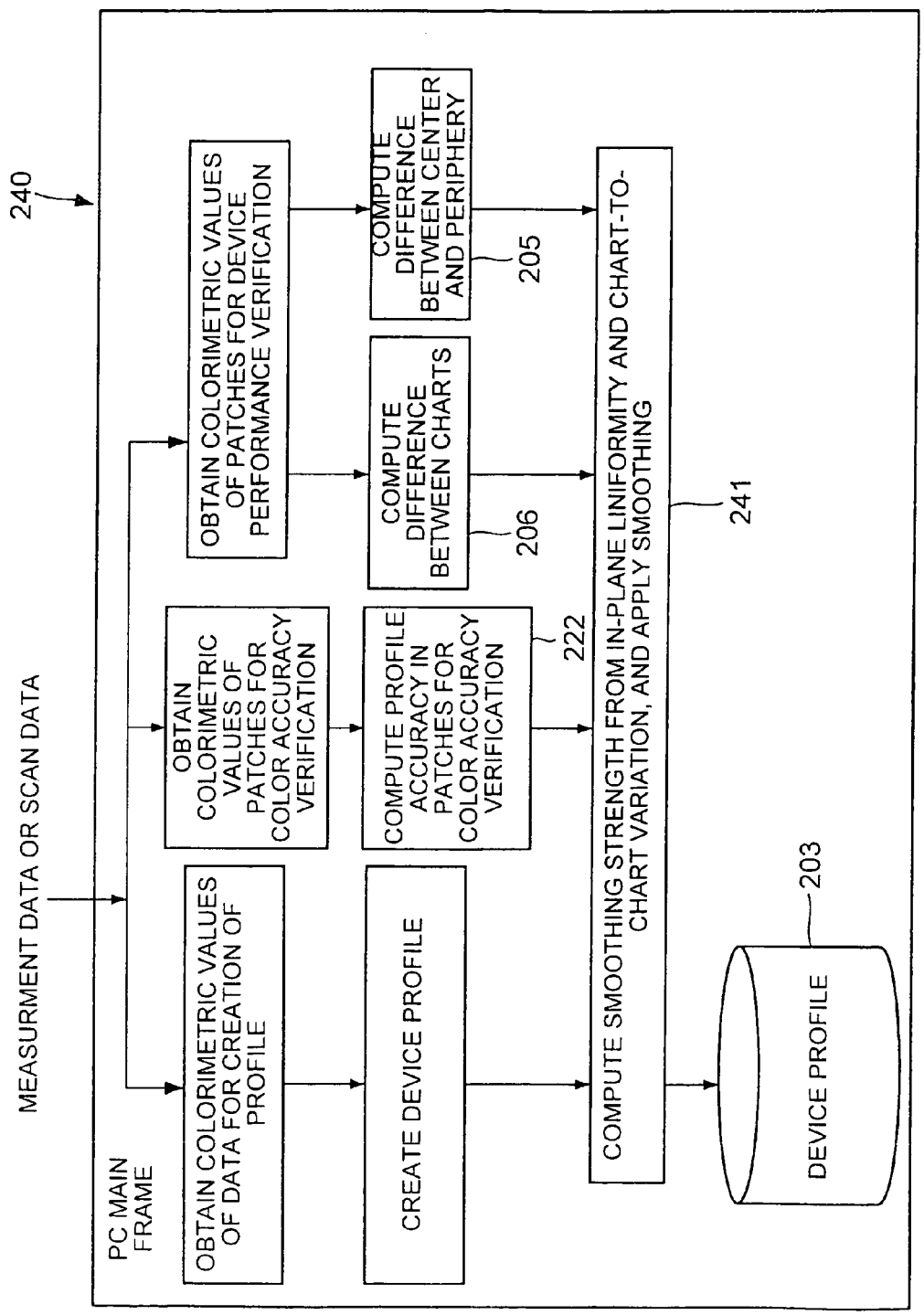
FIG. 14 is a furthermore alternative embodiment of the present invention.

FIG. 14 is a furthermore alternative embodiment of the present invention.

A profile producing apparatus 240 shown in FIG. 14 has also a function of applying smoothing 241 to a profile 203. In the smoothing 241, a suitable strength is computed in accordance with results of computations 205 and 206 for device performance and a result of an accuracy computation 222 of a profile, and the computed strength of smoothing is automatically applied to the profile 203.

Figure 15:
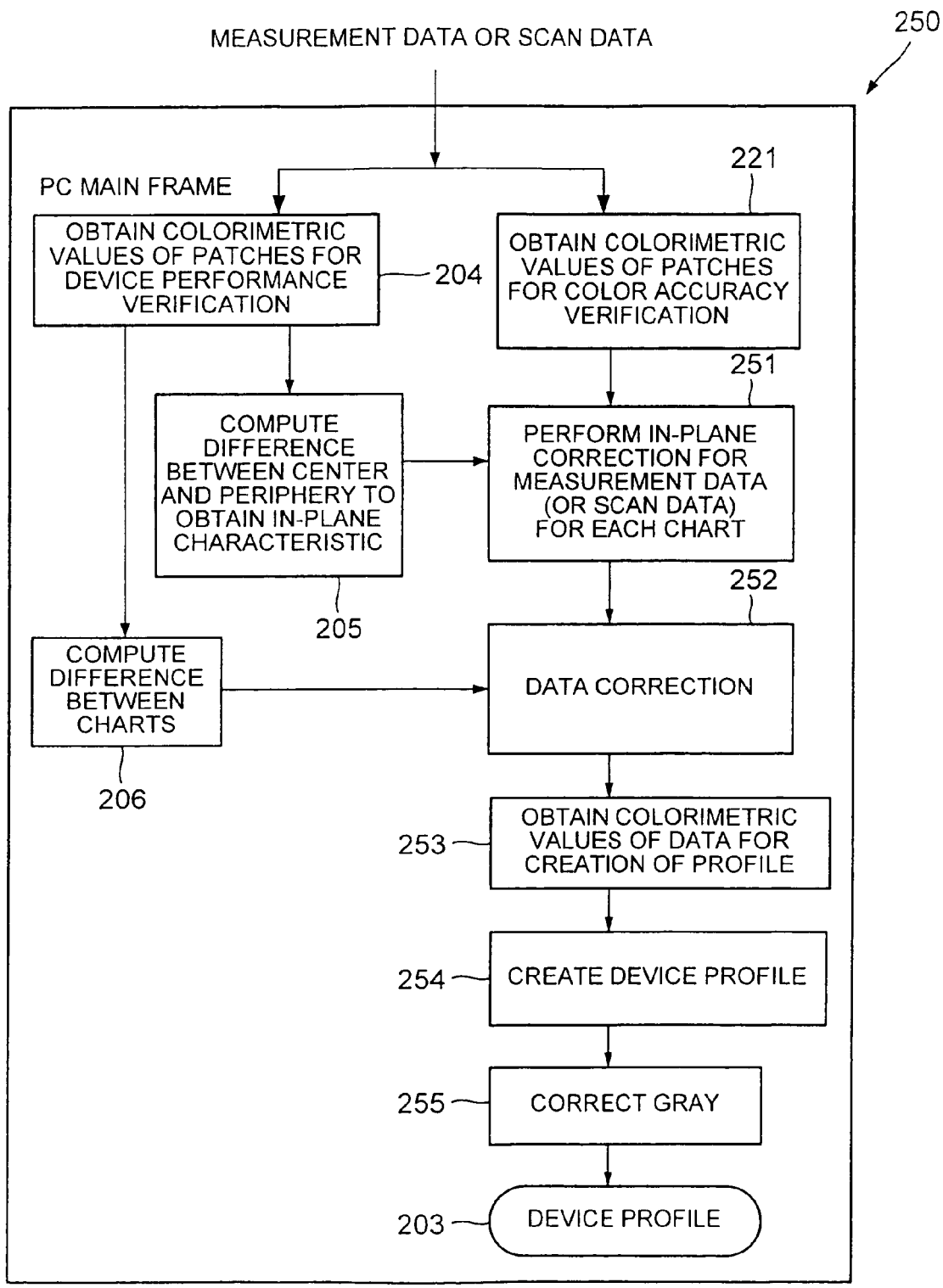
FIG. 15 is a still furthermore alternative embodiment of the present invention.

FIG. 15 is a still furthermore alternative embodiment of the present invention.

A color difference between one in which colors of patches for verification of a profile color accuracy are read and the original color of the patches for verification is representative of a deviation of color subjected to input and output by a device from a correct color. A color difference in the in-plane direction, which is representative of a device performance, indicates that a deviation of the color slants in-plane of a chart sheet.

In view of the foregoing, according to a profile producing apparatus 250 shown in FIG. 15, a correction 251 based on a result of a color difference computation 205 for verification patches in-plane of the chart sheet and a result of an acquisition 221, 204 for colorimetric data for color accuracy verification patches is applied to colorimetric data associated with the lattice points of the above-mentioned N×N×N lattice. It is either acceptable that the correction 251 is an individual correction for each chart sheet or an identical correction for each chart sheet.

A color difference between chart sheets of device performance verification patches represents fluctuation of colors to be inputted and outputted by a device.

In view of the foregoing, according to the profile producing apparatus 250, a further correction 252 based on a result of a color difference computation 206 of verification patches between a plurality of charts is applied to colorimetric data after the correction 251 is applied, so that colorimetric data for other chart sheets are corrected to meet with calorimetric data for a predetermined chart sheet.

And an acquisition 253 of data for creation of a profile is executed, and colorimetric data, to which corrections 251 and 252 are applied, are obtained, so that a creation 254 of a profile based on the calorimetric data and the like is executed.

By the way, a color difference between a color in which a series of gray patches 11e are read and an original color of the series of gray patches represents a distortion of the gray axis. Thus, the profile producing apparatus 250 applies a gray correction 255 in accordance with the above-mentioned color difference on the series of gray patches.

Application of those corrections 251, 252 and 255 makes it possible to create a profile 203 with great accuracy.

Figure 16:
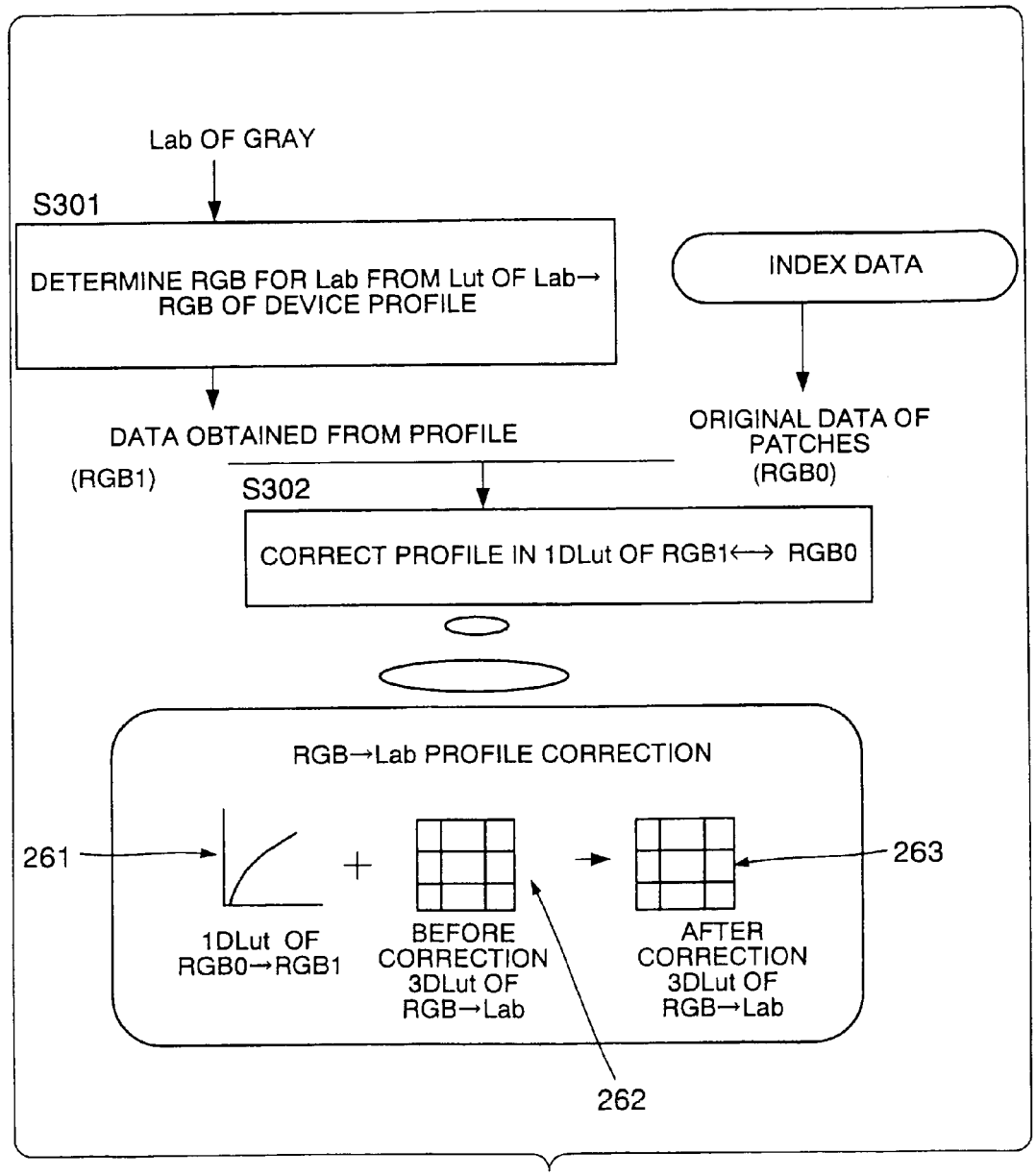
FIG. 16 is a view showing an example of a method of correcting a distortion of a gray axis.

FIG. 16 is a view showing an example of a method of correcting a distortion of a gray axis.

Here, RGB space coordinate values, which are associated with colorimetric data for the above-mentioned series of patches 11e, are determined in accordance with the profile temporarily obtained in the creation 254 of a profile shown in FIG. 15 (a step S301). The coordinate values thus obtained are referred to RGB1 hereinafter. The original RGB space coordinate values of the above-mentioned series of patches 11e are included in the index data 90 explained in conjunction with FIG. 7. The original RGB space coordinate values are referred to RGB0 hereinafter.

Those coordinate values RGB1 and RGB0 are associated with one another so that a one-dimensional LUT 261 is created for each of R, G and B. Thus, a profile is corrected in accordance with those one-dimensional LUTs 261 in the manner as will be described hereinafter (a step S302). That is, RGB coordinate values, which constitute a three-dimensional LUT 262 corresponding to the profile before correction, are converted in accordance with the one-dimensional LUTs 261 to alter the intervals of the above-mentioned lattices, so that a three-dimensional LUT 263 corresponding to the profile after correction is created.

As a method other than the correction method shown in FIG. 16, there is considered, for example, a method in which a portion of the gray axis of the three-dimensional LUT of the profile is directly corrected in accordance with colorimetric data of a series of gray patches, so that portions adjacent to the portion of the gray axis, of the three-dimensional LUT are corrected in such a manner that a correction is made strongly with nearer portion to the gray axis and weakly with farther portion from the gray axis.

As mentioned above, according to the present invention, it is possible to produce a profile taking into consideration a performance of a device and a distortion of a color.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A profile producing apparatus comprising:
a data obtaining section for obtaining read data in which colors of patches constituting a color chart, wherein a plurality of patches each having a predetermined color is arranged and same gray patches are arranged at a plurality of places, are read;
a profile producing section for producing a profile defining an association between coordinate points on a color space depending on a device performing at least one of input and output of a color image and coordinate points on a color space independent of said device in accordance with the read data obtained by said data obtaining section; and
a performance verification section for verifying a performance of said device in accordance with read data involved in the gray patches of the read data obtained by said data obtaining section.

2. A profile producing apparatus comprising:
a data obtaining section for obtaining read data in which colors of patches of a plurality of chart sheets constituting a color chart, wherein a plurality of patches each having a predetermined color is arranged on each chart sheet and same gray patches are arranged at common places of the plurality of chart sheets, are read;
a profile producing section for producing a profile defining an association between coordinate points on a color space depending on a device performing at least one of input and output of a color image and coordinate points on a color space independent of said device in accordance with the read data obtained by said data obtaining section; and
a performance verification section for verifying a performance of said device in accordance with read data involved in the gray patches of the read data obtained by said data obtaining section.

3. A profile producing apparatus according to claim 1, wherein said profile producing apparatus further comprises a correcting section for correcting the profile in accordance with the read data involved in the gray patches of the read data obtained by said data obtaining section.

4. A profile producing apparatus according to claim 2, wherein said profile producing apparatus further comprises a correcting section for correcting the profile in accordance with the read data involved in the gray patches of the read data obtained by said data obtaining section.

5. A profile producing apparatus comprising:
a data obtaining section for obtaining read data in which colors of patches constituting a color chart, wherein a plurality of patches each having a predetermined color is arranged and specific color patches each having a specific color for color accuracy verification are arranged, are read;
a profile producing section for producing a profile defining an association between coordinate points on a color space depending on a device performing at least one of input and output of a color image and coordinate points on a color space independent of said device in accordance with the read data obtained by said data obtaining section; and an accuracy verification section for verifying an accuracy of said profile in accordance with read data involved in the specific color patches of the read data obtained by said data obtaining section.

6. A profile producing apparatus according to claim 5, wherein said profile producing apparatus further comprises a correcting section for correcting the profile in accordance with the read data involved in the specific color patches of the read data obtained by said data obtaining section.

7. A profile producing apparatus comprising:

a data obtaining section for obtaining read data in which colors of patches constituting a color chart, wherein a plurality of patches each having a predetermined color is arranged and regarding main patches of the plurality of patches, patches having relatively high saturation of colors are arranged outside more than patches having relatively low saturation of colors, are read; and a profile producing section for producing a profile defining an association between coordinate points on a color space depending on a device performing at least one of input and output of a color image and coordinate points on a color space independent of said device in accordance with the read data obtained by said data obtaining section.

8. A profile producing method comprising:

a data obtaining step of obtaining read data in which colors of patches constituting a color chart, wherein a plurality of patches each having a predetermined color is arranged and same gray patches are arranged at a plurality of places, are read;

a profile producing step of producing a profile defining an association between coordinate points on a color space depending on a device performing at least one of input and output of a color image and coordinate points on a color space independent of said device in accordance with the read data obtained by said data obtaining step; and a performance verification step of verifying a performance of said device in accordance with read data involved in the gray patches of the read data obtained by said data obtaining step.

9. A profile producing method comprising:

a data obtaining step of obtaining read data in which colors of patches of a plurality of chart sheets constituting a color chart, wherein a plurality of patches each having a predetermined color is arranged on each chart sheet and same gray patches are arranged at common places of the plurality of chart sheets, are read;

a profile producing step of producing a profile defining an association between coordinate points on a color space depending on a device performing at least one of input and output of a color image and coordinate points on a color space independent of said device in accordance with the read data obtained by said data obtaining step; and a performance verification step of verifying a performance of said device in accordance with read data involved in the gray patches of the read data obtained by said data obtaining step.

10. A profile producing method comprising:

a data obtaining step of obtaining read data in which colors of patches constituting a color chart, wherein a plurality of patches each having a predetermined color is arranged and specific color patches each having a specific color for color accuracy verification are arranged, are read;

a profile producing step of producing a profile defining an association between coordinate points on a color space depending on a device performing at least one of input and output of a color image and coordinate points on a color space independent of said device in accordance with the read data obtained by said data obtaining step; and an accuracy verification step of verifying an accuracy of said profile in accordance with read data involved in the specific color patches of the read data obtained by said data obtaining step.

11. A profile producing method comprising:

a data obtaining step of obtaining read data in which colors of patches constituting a color chart, wherein a plurality of patches each having a predetermined color is arranged and regarding main patches of the plurality of patches, patches having relatively high saturation of colors are arranged outside more than patches having relatively low saturation of colors, are read; and a profile producing step of producing a profile defining an association between coordinate points on a color space depending on a device performing at least one of input and output of a color image and coordinate points on a color space independent of said device in accordance with the read data obtained by said data obtaining step.

12. A profile producing program storage medium storing a profile producing program, which causes a computer to serve as a profile producing apparatus comprising:

a data obtaining section for obtaining read data in which colors of patches constituting a color chart, wherein a plurality of patches each having a predetermined color is arranged and same gray patches are arranged at a plurality of places, are read;

a profile producing section for producing a profile defining an association between coordinate points on a color space depending on a device performing at least one of input and output of a color image and coordinate points on a color space independent of said device in accordance with the read data obtained by said data obtaining section; and a performance verification section for verifying a performance of said device in accordance with read data involved in the gray patches of the read data obtained by said data obtaining section, when said profile producing program storage medium is incorporated into said computer.

13. A profile producing program storage medium storing a profile producing program, which causes a computer to serve as a profile producing apparatus comprising:

a data obtaining section for obtaining read data in which colors of patches of a plurality of chart sheets constituting a color chart, wherein a plurality of patches each having a predetermined color is arranged on each chart sheet and same gray patches are arranged at common places of the plurality of chart sheets, are read;

a profile producing section for producing a profile defining an association between coordinate points on a color space depending on a device performing at least one of input and output of a color image and coordinate points on a color space independent of said device in accordance with the read data obtained by said data obtaining section; and a performance verification section for verifying a performance of said device in accordance with read data involved in the gray patches of the read data obtained by said data obtaining section, when said profile producing program storage medium is incorporated into said computer.

14. A profile producing program storage medium storing a profile producing program, which causes a computer to serve as a profile producing apparatus comprising:

a data obtaining section for obtaining read data in which colors of patches constituting a color chart, wherein a plurality of patches each having a predetermined color is arranged and specific color patches each having a specific color for color accuracy verification are arranged, are read;

a profile producing section for producing a profile defining an association between coordinate points on a color space depending on a device performing at least one of input and output of a color image and coordinate points on a color space independent of said device in accordance with the read data obtained by said data obtaining section; and an accuracy verification section for verifying an accuracy of said profile in accordance with read data involved in the specific color patches of the read data obtained by said data obtaining section, when said profile producing program storage medium is incorporated into said computer.

15. A profile producing program storage medium storing a profile producing program, which causes a computer to serve as a profile producing apparatus comprising:

a data obtaining section for obtaining read data in which colors of patches constituting a color chart, wherein a plurality of patches each having a predetermined color is arranged and regarding main patches of the plurality of patches, patches having relatively high saturation of colors are arranged outside more than patches having relatively low saturation of colors, are read; and a profile producing section for producing a profile defining an association between coordinate points on a color space depending on a device performing at least one of input and output of a color image and coordinate points on a color space independent of said device in accordance with the read data obtained by said data obtaining section, when said profile producing program storage medium is incorporated into said computer.

16. The profile producing apparatus of claim 1, wherein said profile producing section produces said profile without reference to a pre-existing profile.

17. The profile producing apparatus of claim 2, wherein said profile producing section produces said profile without reference to a pre-existing profile.

18. The profile producing apparatus of claim 5, wherein said profile producing section produces said profile without reference to a pre-existing profile.

19. The profile producing apparatus of claim 7, wherein the arrangement of the main patches of the plurality of patches in the data obtaining section is consistent in all directions of the color chart.

20. The profile producing method of claim 11, wherein the arrangement of the main patches of the plurality of patches in the data obtaining section is consistent in all directions of the color chart.

21. The profile producing storage medium of claim 15, wherein the arrangement of the main patches of the plurality of patches in the data obtaining section is consistent in all directions of the color chart.

* * * * *